US008991097B2

(12) United States Patent
Giametta

(10) Patent No.: US 8,991,097 B2
(45) Date of Patent: Mar. 31, 2015

(54) TOMATO BOOSTER

(76) Inventor: Joseph Anthony Giametta, Biloxi, MS (US)

( * ) Notice: Subject to any disclaimer, the term of this patent is extended or adjusted under 35 U.S.C. 154(b) by 194 days.

(21) Appl. No.: 13/506,625

(22) Filed: May 3, 2012

(65) Prior Publication Data

US 2013/0291434 A1    Nov. 7, 2013

(51) Int. Cl.
*A01G 7/00*    (2006.01)
*A01G 9/10*    (2006.01)

(52) U.S. Cl.
CPC .......................................... *A01G 9/10* (2013.01)
USPC .................................................. 47/47; 47/5.5

(58) Field of Classification Search
USPC ..................... 47/6, 5.5, 47, 32.4, 30
See application file for complete search history.

(56) References Cited

U.S. PATENT DOCUMENTS

| | | | | |
|---|---|---|---|---|
| 1,868,609 A * | 7/1932 | Lam | | 47/73 |
| 2,021,793 A * | 11/1935 | Lam | | 47/73 |
| 3,053,062 A * | 9/1962 | Geisthoff | | 47/5.5 |
| 3,940,884 A * | 3/1976 | Mason, Jr. | | 47/32 |
| 4,012,866 A * | 3/1977 | Brokaw | | 47/6 |
| 4,850,615 A * | 7/1989 | Giametta | | 285/12 |
| 4,946,203 A * | 8/1990 | Giametta | | 285/189 |
| 5,052,939 A * | 10/1991 | Koch | | 439/133 |
| 5,465,526 A * | 11/1995 | Langley | | 47/33 |
| 5,479,741 A * | 1/1996 | Underwood | | 47/30 |
| 6,357,172 B1 * | 3/2002 | Risgaard et al. | | 47/32.4 |
| 8,181,386 B1 * | 5/2012 | Riley, Jr. | | 47/29.2 |
| 2005/0172549 A1 * | 8/2005 | Allen | | 47/32.4 |

FOREIGN PATENT DOCUMENTS

| | | | | | |
|---|---|---|---|---|---|
| EP | 21963 A1 * | 1/1981 | | A01G 9/10 |
| GB | 2057234 A * | 4/1981 | | A01G 1/00 |
| GB | 2108813 A * | 5/1983 | | A01G 9/00 |
| GB | 2213033 A * | 8/1989 | | A01G 13/02 |

* cited by examiner

*Primary Examiner* — Kristen C Hayes
(74) *Attorney, Agent, or Firm* — Ash Tankha; Lipton, Weinberger & Husick

(57) ABSTRACT

A tomato booster is disclosed with stackable hollow cylinders and vertical interlocking doors adapted to allow a tomato plant space for growth of secondary root systems in a vertical position. A method of using the tomato booster is also disclosed.

7 Claims, 3 Drawing Sheets

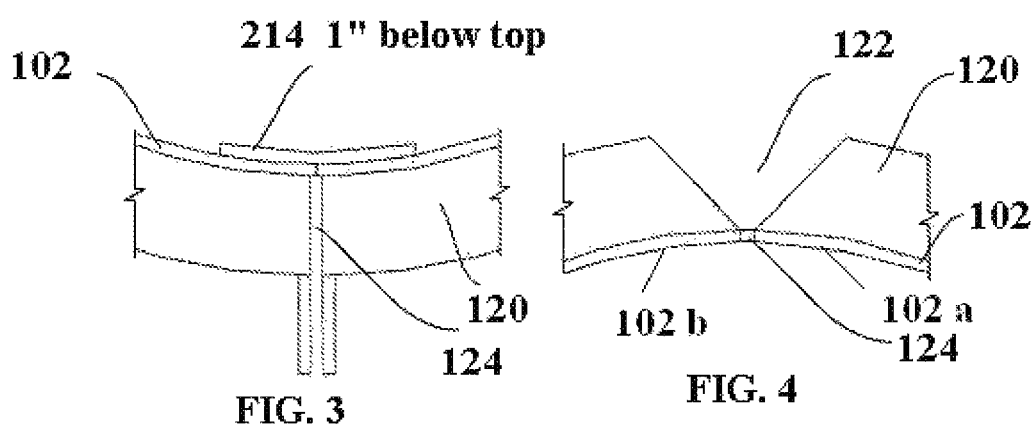
FIG. 3
FIG. 4
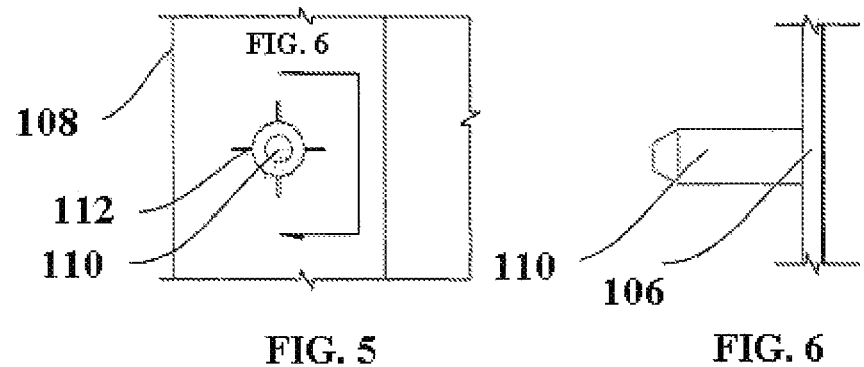
FIG. 5
FIG. 6

TOMATO BOOSTER

BACKGROUND OF THE INVENTION

The tomato booster relates generally to gardening accessories and more particular to planters within which plants are planted for growth and also tomato plants growing in the garden.

Years ago, even today, it was common knowledge that the best way to grow a tomato plant was to trim off all leaves off the stem, leaving only the top portion. Then dig a trench and lay the plant horizontally with the top end turned up. After this is complete, cover with dirt, water and fertilizer. This method allows the root system on the stem to expand to make a strong healthy plant. Using the tomato booster disclosed herein, the same results are accomplished when the one step method is completed, only in a vertical position instead of a horizontal one.

SUMMARY OF THE INVENTION

The type of tomato booster concerned includes those which are adapted to contain dirt or potting mix and a plant which is planted with the potting mix. The tomato booster can also be used on other tomato plants growing in the garden which are at least twelve to fourteen inches long.

Accordingly it is an object of the present tomato booster to provide a new and improved method of providing space for boosting the root system of the tomato plant whether grown in a pot or in the garden. This is done by applying a one step method. This is accomplished by allowing the plant to grow twelve to fourteen inches above the ground or potting mix. Then turning the tomato booster with its soil contact end down and setting upright on the ground adjacent to the plant, measure to trim all leaves even with the stem to the top of the booster. The open cylinder or tomato booster can then be placed around the stem of the plant and pressed closed and pushing its soil contact end into the ground.

One more object of the present tomato booster is to provide the plant being grown to be fed and watered with relative ease. By using the tomato booster all water and fertilizer applied goes directly to the root section. Yet another object of the present booster provides one which is readily small in size to facilitate shipping, packing and storing. A further object of the tomato booster is to provide such a booster which is uncomplicated in construction yet effective in operation.

Accordingly several advantages of one or more aspects are as follows: To provide a tomato booster that will produce more tomatoes whether it is in a planter or in the garden. To provide a tomato booster that will help the plant develop a stronger root system producing more tomatoes. Another advantage of the tomato booster is to grow a root system in a vertical position. Still another advantage is to provide a booster that will fit into any eight inch by eight inch size planter as well as around any in garden tomato plants, thus providing a funnel type fertilizing and watering system directed to the root system. Unlike the upside down planter, the tomato booster tomato plant will grow faster since it has a secondary root system thus allowing a stronger tomato plant to quickly yield more tomatoes.

The tomato booster is both efficient in cost and also shipping. It can be shipped in a plastic bag. It also because of size has a low capacity for potting mix making it cheaper to grow a tomato plant. It can also be used in any discarded planters and is reusable. The upside down planter is much larger and cost more to manufacture and ship. It also contains more potting mix which in turn requires more water and much more fertilizer. Other advantages of one or more aspects will be apparent from a consideration of the drawings and ensuing description.

The embodiments reside in a tomato booster for growing a tomato plant having a root system and stem which extends from the root system. There is also a one step of planting required to fulfill the object of the embodiments. The first step is to allow the plant to grow twelve to fourteen inches above the ground or potting mix. Then turning the tomato booster with its soil contact end down and setting upright on the ground adjacent to the plant, measure to trim all leaves even with the stem from the top to the bottom of the tomato booster. The open booster can then be placed around the stem of the plant and pressed closed engaging its soil contact end into the ground. Fill with potting mix water and liquid fertilize to complete the process.

The tomato booster when in place acts as a booster to the fine white fuss like roots developing on the stem of the plant. The booster can also be used on tomato plants growing in the garden as well as potting mix containers to increase their yield. Further the booster permits the user to water and fertilize the plant by pouring a mixture of liquid fertilizer on a periodic basis and watering once a day from the top of the booster. The booster should be filled with a good grade of potting mix up to one inch from the top. Thus the water which is needed by the plant being grown goes directly to the plant roots with no dramatic loss due to runoff. The tomato plant will also need some sort of support with its tremendous growth.

BRIEF DESCRIPTION OF THE DRAWINGS

FIG. 3 is a view of the inside overlap.
FIG. 4 is a view of the cutaways.
FIG. 5 is a view of the male lock.
FIG. 6 is a view of the female lock.

DRAWINGS

Reference Numerals

102—Hollow Cylinder
104—Soil contact end
106—Male Offset
108—Female Offset
110—Male Lock
112—Female Lock
214—Overlap
116—Circular Stop
118—Vertical Side Door
120—Engager
122—Cutaways
124—Slits
102a—First semicircular half of cylinder 102
102b—Second semicircular half of cylinder 102

DETAILED DESCRIPTION OF THE INVENTION

Figure 1:
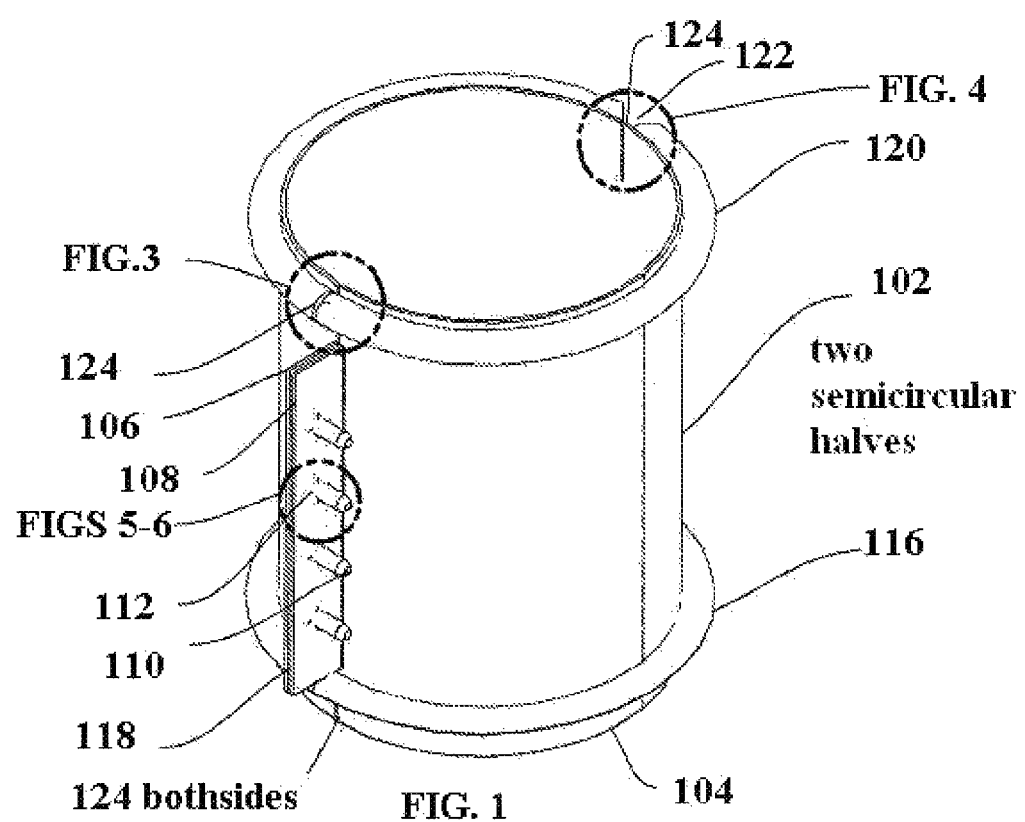
FIG. 1 is a front view of tomato booster with its vertical side door closed.
Figure 2:
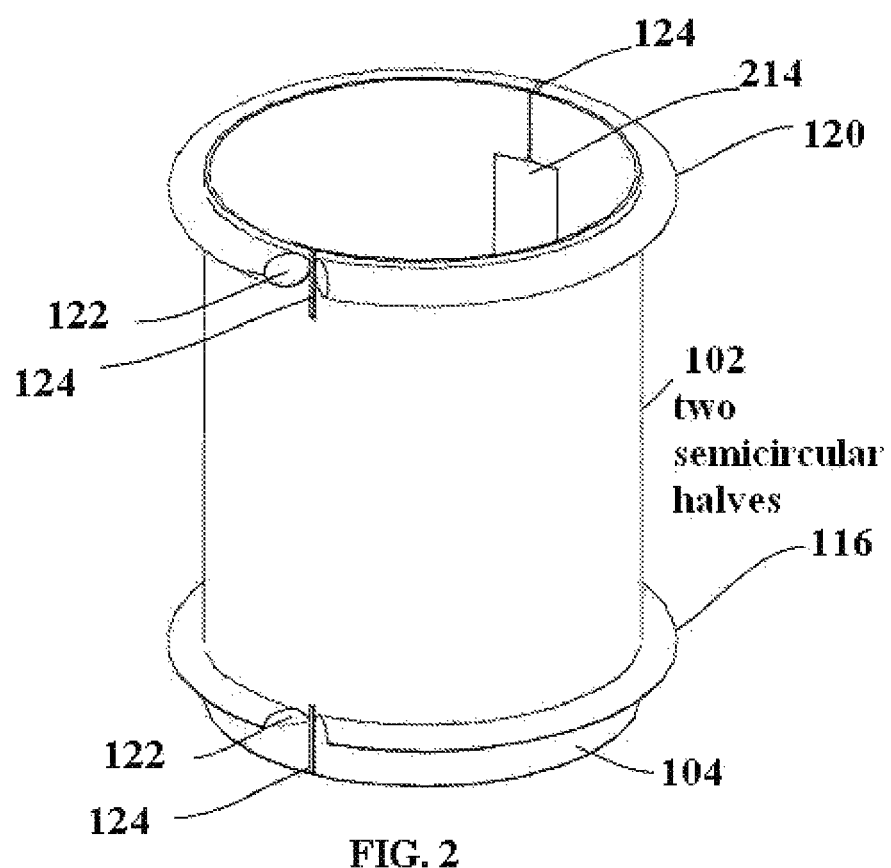
FIG. 2 is a rear view of the tomato booster.

Turning now to the drawings in greater detail. There is shown embodiments generally indicated of the tomato booster in FIG. 1. The hollow cylinder 102 with its open top and bottom has a vertical side door 118 with two offsets 106 and 108, and is made up of two semicircular halves 102a and 102b, each semicircular half attached to an offset, the male offset 106 attached to first semicircular half 102a of the hollow cylinder 102, the female offset 108 attached to the second semicircular half 102b of the hollow cylinder 102, these offsets 106 and 108 are on a ninety degree angle perpendicular to the cylinder 102's body. On the male offset 106 are four equally spaced male locks 110. On the female offset 108 are four preformed round holes for female locks 112 with four slits at ninety degree angles intersecting the preformed female locks 112 compatible to the male locks 110. The overlap 214 (see FIG. 2) begins one inch from the top of the tomato booster and ends at circular stop 116. On the inner side of the tomato booster an overlap 214 is formed to continue horizontally beyond male offset 106 to form a barrier over the closed vertical side door 118. On the hollow cylinder's bottom is soil contact end 104 for ease in determining the depth when it is placed into the soil with circular stop 116 in place. On the top side of the hollow cylinder 102 is engager 120 which is used to push the cylinder into the ground or potting mix. It is on the outside of the hollow cylinder 102 with its bottom inside reinforced to the hollow cylinder 102 and also acts as a mate for stacking with circular stop 116. Soil contact end 104 has a one eighth inch offset to the inside of the tomato booster to allow its one inch end to enter the topside of the booster for stacking. When closing the tomato booster place a finger on each side of the offsets 106 and 108 with the locks 110 and 112 aligned and pressed together.

As will be apparent that the tomato booster provides a cavity that can contain dirt or potting mix after being placed around a tomato plant in a planter or in the garden pushing its soil contact end 104 into the ground until the bottom of the cylinder's circular stop 116 limits it depth to one inch in the ground. When the tomato plant has grown to twelve or fourteen inches tall a one step method should occur as follows: Turn the tomato booster contact end downward and setting upright on the ground adjacent to the plant, measure to trim all leaves even with the stem to the top of the tomato booster. The open booster can then be placed around the stem of the plant, pressed closed, and engaging its soil contact into the ground. When this is complete, fill it with potting mix to one inch from the top and water and feed with liquid fertilizer. The plant should be watered daily and administered with liquid fertilizer when applicable.

A novel feature of the tomato booster is that it can be stacked for an additional space for root formation. This is accomplished when the tomato plant has grown to three to four feet tall. Since the booster can be engaged into the top of another booster the same one step method is applied. First cut all leaves even with the stem to the height of the booster. Place the booster around the plant and close the booster. Push the booster into the top of the other booster and fill with a good grade of potting mix to within one inch of the top and turning it as to cover slit 124 above offset 106 and 108. Next water thoroughly and feed with liquid fertilizer.

Exemplary dimensions of the tomato booster are as follows: The hollow cylinder 102 is round and is one sixteenth inch thick with its inside diameter being six inches and its height being eight inches tall. Its offsets 106 and 108 are one inch wide and are one sixteenth inch thick. The male and female locks 110 and 112 are in the center of male and female offsets 106 and 108 and are equally spaced to conform within each other. The four male locks 110 are smooth end studs and are one half inch long and one quarter inch in diameter. The ends are tapered to one sixteenth of an inch half way from the end of the studs to allow easy entry into the four preformed round female locks 112 (see FIG. 6). The four female locks 112 are one eight inch round with four one sixteenth inch slits three thirty second inches long at ninety degree angles intersecting the female lock 112 (see FIG. 5). On cylinder 102's bottom side is circular stop 116 which is a one hundred eighty degree half circular and made to conform with engager 120. On the hollow cylinder 102's top is engager 120 which is one half inch in diameter and round in appearance with its bottom inside reinforced to the hollow cylinder 102 and mounted directly on the top side of the hollow cylinder ending at slit 124 to engage the hollow cylinder into the ground. Engager 120 has a one sixteenth slit 124 from the top of the engager 120 to the top of the offsets 106 and 108 in the center of the vertical side door 118 and also one on the opposite side with cutaways 122 for ease in opening the booster (see FIGS. 2-4).

On the inner part of the tomato booster is an overlap 214 which is a continuation of the hollow cylinders 102's inner side surpassing male offset 106. The overlap is one inch beyond the entrance 118 when the hollow cylinder is closed. The male and female offsets 106 and 108 begin one inch under engager 120 and ends one inch short of the hollow cylinder 102's side leaving room for one inch into the soil when circular stop 116 is engaged. The circular stop 116 is made to conform with the outside diameter of the engager 120 covering its top side with its inner side reinforced to the side of the hollow cylinder 102. The hollow cylinder 102 soil contact end 104 has a one sixteenth inch slit at the door side and another one a hundred eighty degrees on the opposite side up through circular stop 116. The soil contact end 104 offsets to the inside one eighth of an inch to allow it to enter the hollow cylinder 102's top side for stacking and is one inch long from the top of engager 120. The overlap 214 begins above the top of circular stop 116 and is mounted one half inch on the vertical side door 118 on the inside wall of the hollow cylinder 102 and to the left of male offset 106 extending one inch past the vertical side door 118 horizontally and terminates vertically one inch from the top of engager 120. The cutaway 122 extends from the wall of the booster and beginning at slit 124 and extending on an angle to one half inch all around the engager 120 and the circular stop 116 on each side of slit 124, each cutaway extending outward from slit 124 (see FIGS. 2-4).

The tomato booster and its embodiments are made of plastic but different materials can also be used. Although the descriptions above contain many specification, these should not be construed as limiting the scope of the embodiments for example the locks can be made in many different shapes and forms. And the hollow cylinder can be made into other shapes such as square, oblong, oval, two piece or more, expandable and etc. The closure can be formed in many different types and forms of pressure locks even to the use of snaps and Velcro and hook type. Bags can also be used. The reason for the top and bottom of the hollow cylinder to be fully open is to allow any secondary stems on the plant to be easily accepted especially when the plant has exceeded three or more feet tall. The vertical side door can be of any type lockable or not lockable, and it will not come in the way of the objective of the booster to accommodate stacking for a secondary root system. Thus the scope of the embodiments should be determined by the appended claims and their legal equivalence rather than by the examples given.

I claim:

1. A tomato booster comprising a plurality of hollow cylinders stackable on top of each other and adapted to provide space to a tomato plant for growth of secondary roots in a vertical position, comprising:
   said plurality of hollow cylinders comprising an open top end, an open bottom end, and two semi-circular halves;
   interlocking vertical side doors perpendicular and external to a body wall of said hollow cylinders, wherein each of said interlocking vertical side doors comprises a set of two offsets parallel to each other, wherein said set of two offsets comprises a male offset attached to a first half of said two semi-circular halves of each of said hollow cylinders, wherein said set of two offsets further comprises a female offset attached to a second half of each of said two semi-circular halves of each of said hollow cylinders, wherein said male offset comprises a plurality of male locks and said female offset comprises a plurality of female locks, wherein said plurality of said male locks and said plurality of said female locks are adapted for mating with each other for opening and closing of said hollow cylinders;

cylindrical stops at a bottom of said hollow cylinders and engagers at a top of said hollow cylinders, wherein said cylindrical stop is adapted for one of fixing said tomato booster into a soil around a root of said tomato plant and for stacking said tomato boosters on top of each other, wherein said engager is adapted to mate with said cylindrical stop for said stacking of said tomato boosters on top of each other;

slits at a front end and a rear end of said hollow cylinders for separating said two halves of each of said hollow cylinders;

angular cutaways at said rear end of said hollow cylinders acting as a hinge and facilitating easy opening of said tomato boosters;

said hollow cylinders adapted to form a cylindrical cavity around a stem of said tomato plant when said hollow cylinders encircle said stem of said tomato plant, wherein said cylindrical cavity is adapted for filling a potting mix or dirt, wherein said potting mix or dirt fully encircles said stem of said tomato plant, wherein said cylindrical cavity is further adapted for receiving a periodic supply of fertilizers and a daily supply of water, wherein said body walls of each of said hollow cylinders are adapted to prevent wastage of said received fertilizers and said received water, and wherein said potting mix or dirt, said water, and said fertilizers facilitate said growth of said secondary roots on said stem in said tomato plant in said vertical position.

2. The tomato booster as defined in claim 1, wherein said male locks are smooth end studs that are tapered at their ends.

3. The tomato booster as defined in claim 1, wherein said female locks are preformed round holes with slits at ninety degree angle intersecting said female locks.

4. The tomato booster as defined in claim 1, wherein a closure of said interlocking side door occurs when the offsets are pressed together to engage the locks.

5. The tomato booster as defined in claim 1, wherein inside said cylinder, said body wall extends past the male offset to form an overlap.

6. The tomato booster as defined in claim 1, wherein said angular cutaways are adapted for restricting said opening of said tomato booster up to a desired extent.

7. The tomato booster as defined in claim 1, wherein said stacking of said hollow cylinders facilitates development of said secondary root system in said tomato plant.

* * * * *